(12) United States Patent
Kim

(10) Patent No.: US 11,175,699 B2
(45) Date of Patent: Nov. 16, 2021

(54) CASE FOR MOBILE DEVICE

(71) Applicant: Dong In Kim, Seoul (KR)

(72) Inventor: Dong In Kim, Seoul (KR)

( * ) Notice: Subject to any disclaimer, the term of this patent is extended or adjusted under 35 U.S.C. 154(b) by 321 days.

(21) Appl. No.: 16/370,862

(22) Filed: Mar. 29, 2019

(65) Prior Publication Data

US 2020/0310491 A1    Oct. 1, 2020

(51) Int. Cl.
| | |
|---|---|
| *H02J 7/00* | (2006.01) |
| *G06F 1/16* | (2006.01) |
| *H02J 7/02* | (2016.01) |
| *A45C 13/00* | (2006.01) |
| *A45C 11/00* | (2006.01) |

(52) U.S. Cl.
CPC .......... *G06F 1/1635* (2013.01); *A45C 13/002* (2013.01); *G06F 1/1626* (2013.01); *H02J 7/0044* (2013.01); *H02J 7/025* (2013.01); *A45C 2011/002* (2013.01)

(58) Field of Classification Search
USPC ................................. 320/106, 107, 108, 110
See application file for complete search history.

(56) References Cited

U.S. PATENT DOCUMENTS

| | | | | |
|---|---|---|---|---|
| 8,805,456 B1 * | 8/2014 | Hardy | ............... | H04M 1/72412 |
| | | | | 455/573 |
| 9,553,960 B1 * | 1/2017 | Liusvaara | ................ | H04R 7/10 |
| 2015/0115867 A1 * | 4/2015 | Chang | ....................... | H02J 7/35 |
| | | | | 320/101 |
| 2015/0130979 A1 * | 5/2015 | Huang | ................. | H04B 5/0081 |
| | | | | 348/333.01 |
| 2016/0072303 A1 * | 3/2016 | Jeong | ....................... | H04B 1/38 |
| | | | | 307/104 |
| 2017/0047785 A1 * | 2/2017 | Twelker | ................ | H02J 7/0042 |
| 2017/0077754 A1 * | 3/2017 | Jeong | ...................... | H02J 50/12 |
| 2017/0170678 A1 * | 6/2017 | Uhm | ................... | H02J 7/00308 |
| 2019/0341958 A1 * | 11/2019 | Coverstone | ........... | H04M 19/04 |
| 2020/0036235 A1 * | 1/2020 | Lee | ..................... | H04M 1/0249 |

FOREIGN PATENT DOCUMENTS

| | | | |
|---|---|---|---|
| KR | 1020140135899 | * | 11/2014 |
| KR | 10-1608389 B1 | | 4/2016 |

* cited by examiner

*Primary Examiner* — Brian Ngo
(74) *Attorney, Agent, or Firm* — Studebaker & Brackett PC

(57) ABSTRACT

The present disclosure relates to a case for a mobile device capable of activating a wireless charging function. The case for a mobile device according to the present disclosure includes a cover unit mounted on a mobile device to protect the mobile device, a first power source attaching part provided in the cover unit and attached to and detached from a power source device configured to wirelessly charge the mobile device, and a wireless charge activation part configured to perform charging of a battery of the mobile device when the power source device is recognized as being close to the mobile device.

6 Claims, 6 Drawing Sheets

CASE FOR MOBILE DEVICE

BACKGROUND

1. Field of the Invention

The present disclosure relates to a case for a mobile device, and more specifically, to a case for a mobile device capable of activating a wireless charging function.

2. Discussion of Related Art

Through development of an information and communication technology and a semiconductor technology, multipurpose electronic products are becoming miniaturized to be capable of having mobility and portability, and after smart phones have become popularized, a functional combination of a product is further accelerated. In addition to popularization of the smart phones, a market of accessories for the smart phones is quickly growing.

Representatively, demands for smart phone cases can be seen to be saturated as much as a market for smart phones not only for a functional purpose for protecting the outside including a display part, a touch panel part, and the like of a smart phone from a physical impact or the like but also for an aspect of aesthetic satisfaction for supplementing a color or design of the smart phone.

Meanwhile, as one of technical issues of the smart phone, a wireless charging function in which charging is wirelessly performed to supply power to a battery of the smart phone, for example, a wireless charging function according to a magnetic induction method, a magnetic resonance method, an electromagnetic wave method, or the like has been reflected as an essential function of the smart phone because standardization such as wireless power consortium (WPC) or alliance for wireless power (A4WP) is already proceeding.

In such an environment, despite commercialization of wireless charging, the present disclosure is aimed according to the recognition that the wireless charging function cannot be smoothly performed due to a smart phone case used for protection of a product and aesthetic desire.

(Patent Document 1) Korean Application Patent No. 1554109

SUMMARY OF THE INVENTION

The present disclosure is directed to providing a case for a mobile device capable of activating a wireless charging function.

According to an aspect of the present disclosure, there is provided a case for a mobile device including a cover unit mounted on a mobile device to protect the mobile device, a first power source attaching part provided in the cover unit, and attached to and detached from a power source device configured to wirelessly charge the mobile device, and a wireless charge activation part configured to perform charging of a battery of the mobile device when the power source device is recognized as being close to the mobile device.

The cover unit may be made of polycarbonate (PC), polyurethane (PU), silicon, or a composite material including the above.

The cover unit may include an inner cover main body formed in a shape corresponding to the mobile device to surround a back surface portion of the mobile device and an outer cover main body formed in a shape corresponding to the inner cover main body to surround the inner cover main body, and the first power source attaching part may be formed to be located between the inner cover main body and the outer cover main body.

The case for a mobile device may further include a battery unit including a charging part detachably attached to the cover unit at a rear of the cover unit and configured to supply power to wirelessly charge the mobile device, an induction coil part transferring the power from the charging part to the mobile device so that the mobile device is wirelessly chargeable, and a second power source attaching part coupled to the first power source attaching part to be attached to the cover unit.

The first power source attaching part and the second power source attaching part may be provided at locations corresponding to each other in the cover unit and the battery unit, and one or both of the first power source attaching part and the second power source attaching part may be formed of a magnet for magnetic coupling or a metal material coupled to the magnet.

The battery unit may include a battery main body having a predetermined inner space so that the charging part may be accommodated therein and a coil mounting plate coupled to a front of the battery main body exposed to the cover unit and provided with the induction coil part and the second power source attaching part.

The battery main body may be provided with a light emitting lamp turned on through a charging power source of the charging part and a lighting button configured to turn the light emitting lamp on and off.

A substrate part configured to mount the light emitting lamp may be embedded in the battery main body, and the second power source attaching part formed on the coil mounting plate may be positioned so as not to overlap the substrate part and the induction coil part so as not to affect driving of the substrate part and the induction coil part.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
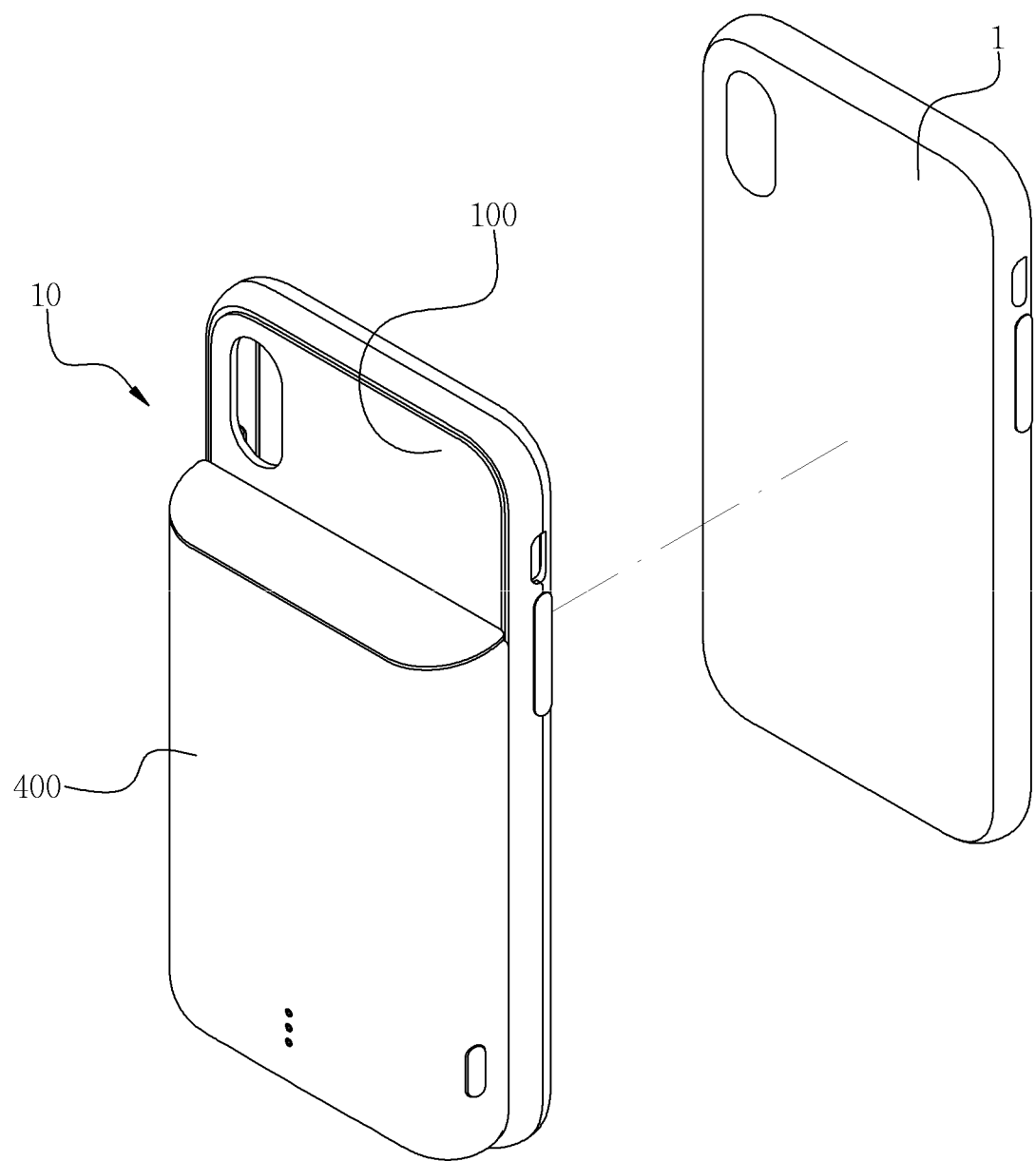
FIG. 1 is a perspective view of an embodiment of a case for a mobile device of the present disclosure.
Figure 2:
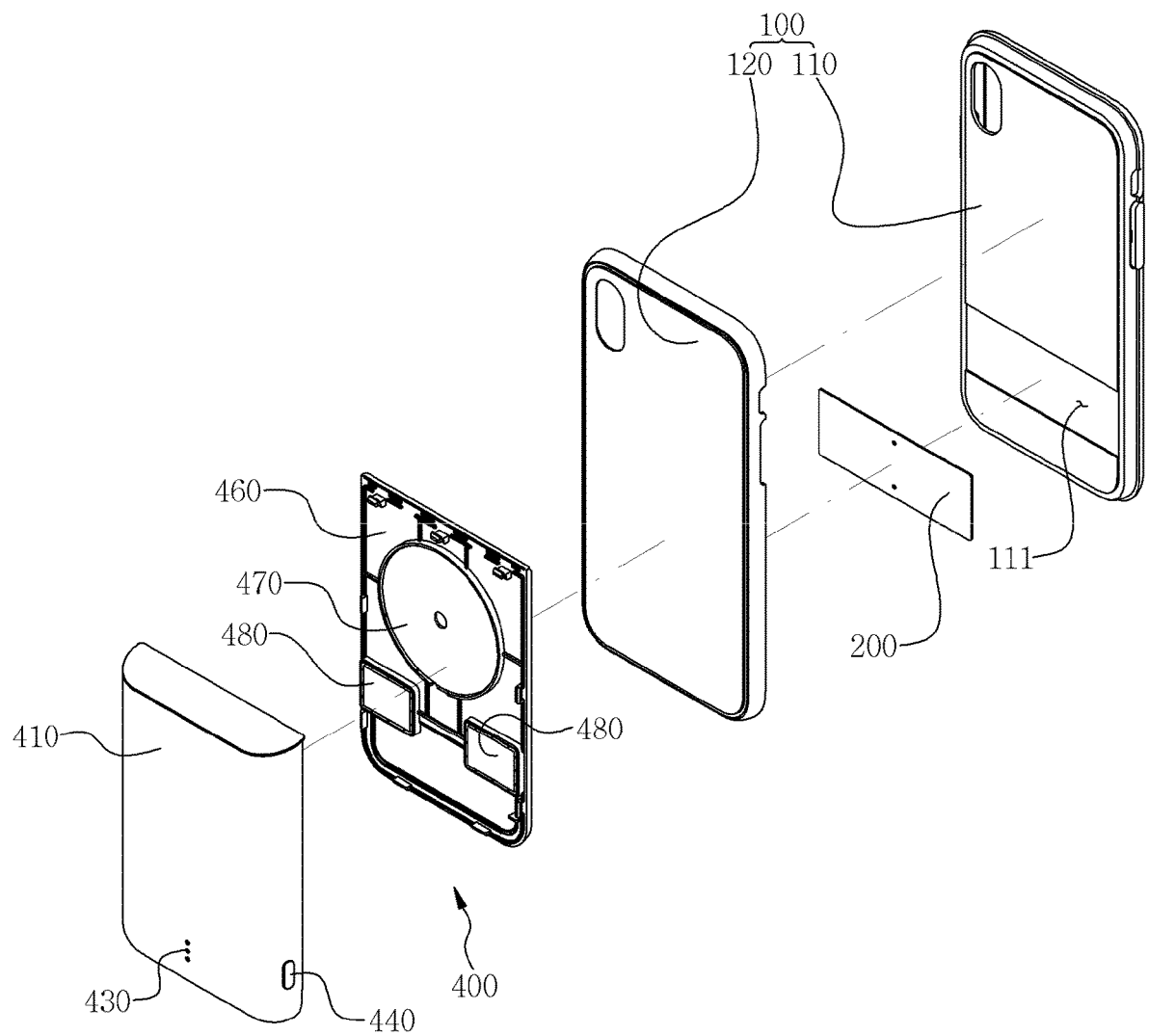
FIG. 2 is an exploded perspective view of the case for a mobile device in FIG. 1.
Figure 3:
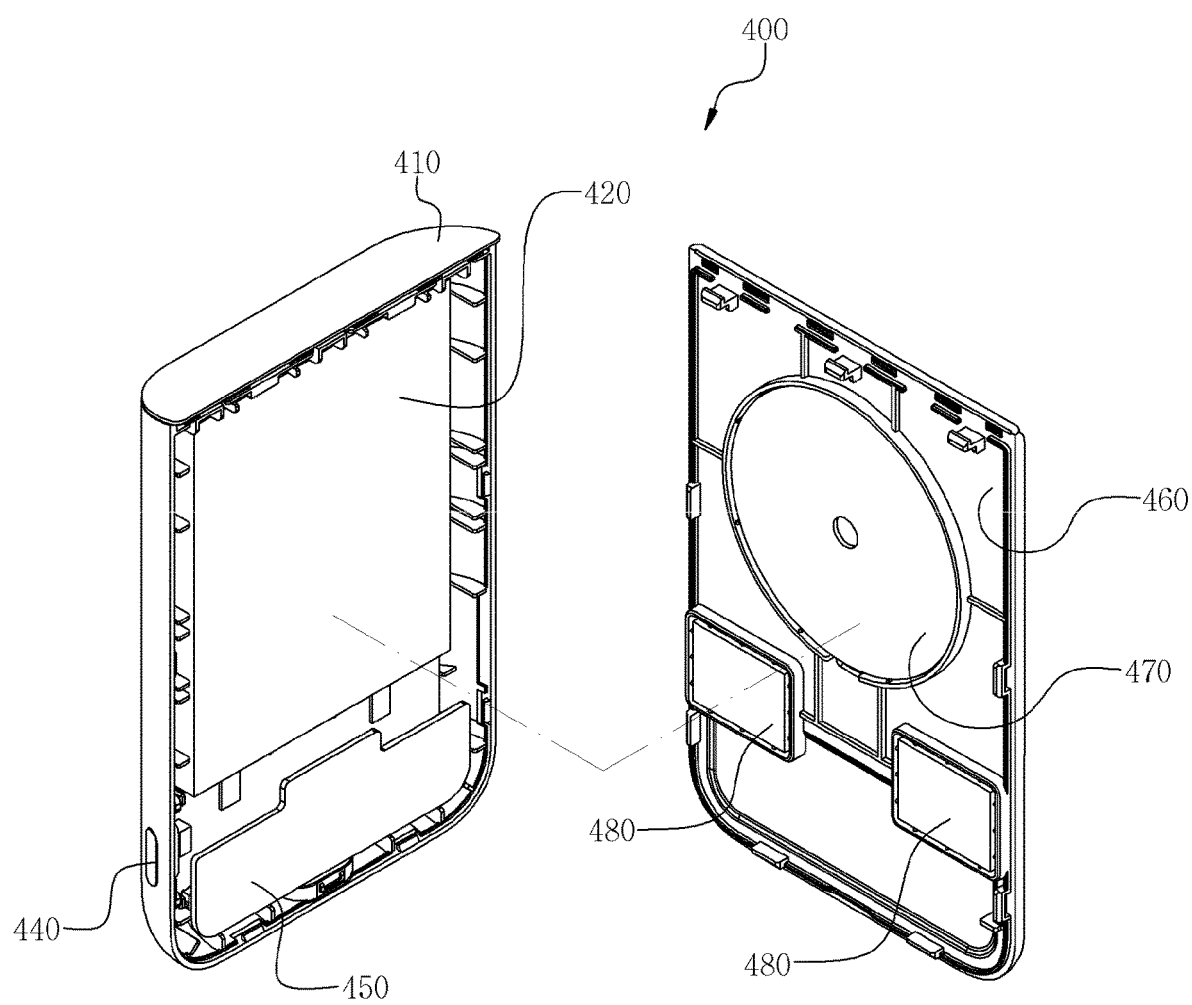
FIG. 3 is an exploded perspective view of a battery unit of the case for a mobile device in FIG. 1.
Figure 4:
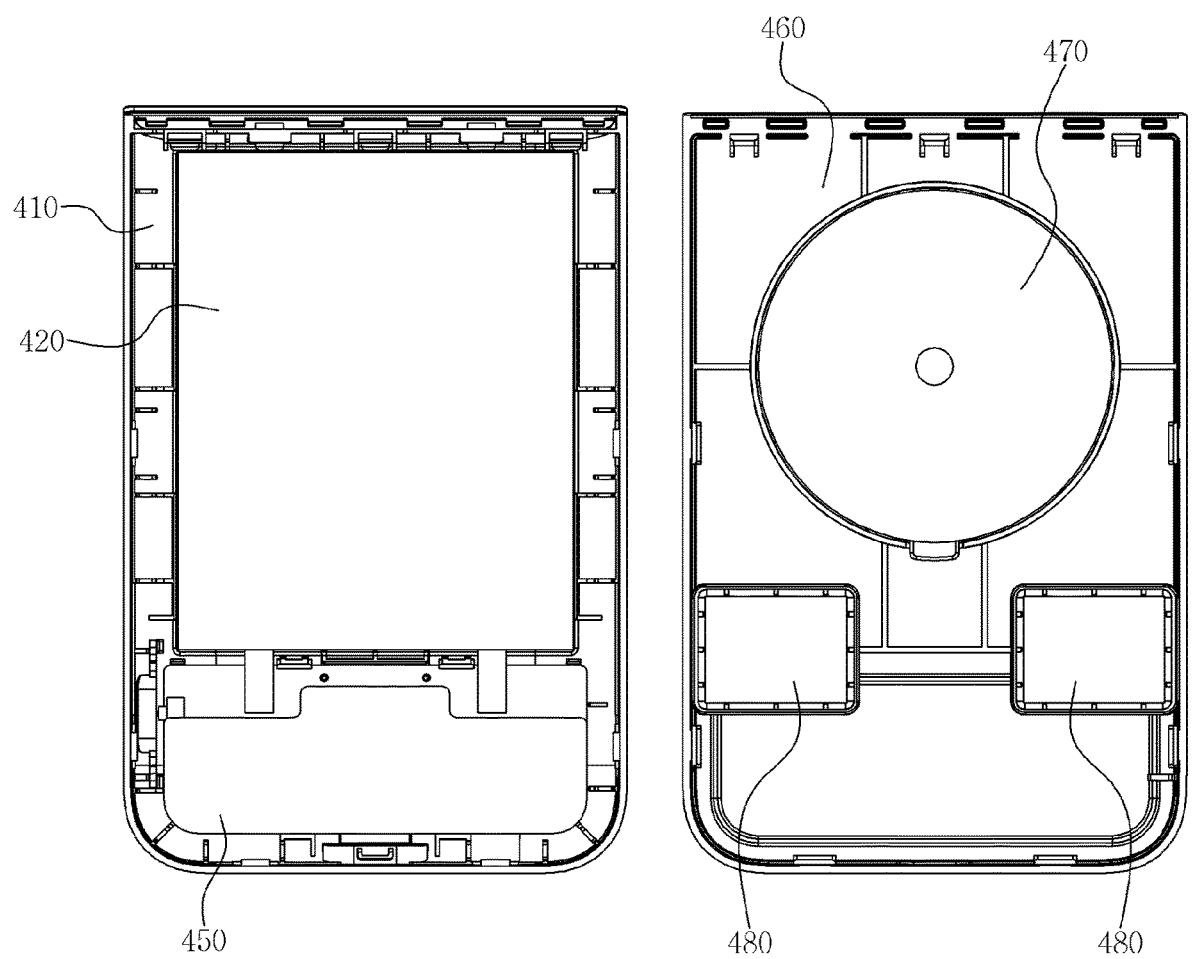
FIG. 4 is a front view of a battery part of the separated battery unit in FIG. 3.
Figure 5:
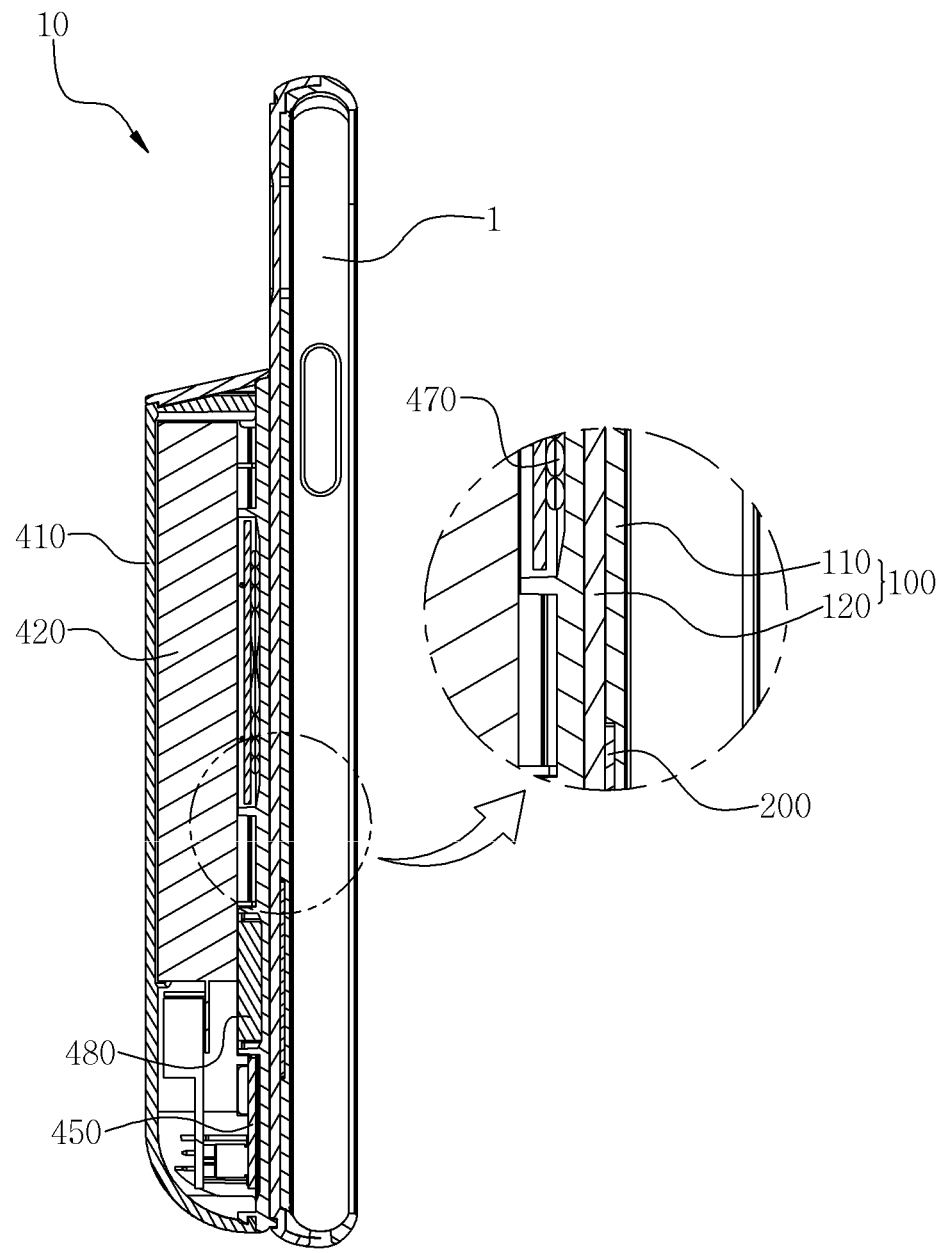
FIG. 5 is a cross-sectional view of a state in which the case for a mobile device in FIG. 1 is mounted on the mobile device.

Hereinafter, a case for a mobile device according to an embodiment of the present disclosure will be described in detail with reference to the accompanying drawings.

In a description of certain embodiments performable by the present disclosure, since elements or characteristics of the present disclosure are disclosed, when a description related to the above may obscure the principle of the present disclosure, the detailed description will be omitted and a particular embodiment exemplified in the drawings will be mainly described in the text of the detailed description. However, it should be understood that the present disclosure is not limited to the particular embodiment and includes changes, modifications, transformations and equivalents within spirit and technical scope of the present disclosure.

Terms "including" or "configured" in the specification refer to existence of corresponding characteristics, properties, configurations, or components, but should not include only the above characteristics, properties, configurations, or components and not preclude probability of existence or a case of addition of least one other characteristic, property, configuration, component or a combination of the above.

Further, a term "exemplary" in the specification refers to "provided as an example, one case, or one sort of exemplification", and an "exemplary" aspect should not be interpreted to be more preferable or advantageous than other aspects. In addition, the term should be understood to include a plural form which is greater than or equal to one when not apparently mentioned to be a singular form in the specification.

In FIGS. 1 to 6, an embodiment of a case for a mobile device (hereinafter referred to as a "mobile device case") 10 according to the present disclosure is described in a perspective view, an exploded perspective view, and a cross-sectional view.

The mobile device case 10 may activate a wireless charging function of a mobile device 1 when a power source device approaches that is capable of performing wireless charging on the mobile device 1 which is wirelessly chargeable.

The mobile device case 10 of the present embodiment includes a cover unit 100 mounted to surround the mobile device 1, a first power source attaching part 200 provided to be attached to and detached from a power source device, and a wireless charge activation part 300 configured to sense approach of the power source device and perform charging of the mobile device 1.

The cover unit 100 is provided to surround the outside of the mobile device 1 as described above and may be formed of polycarbonate (PC), polyurethane (PU), silicon, or a composite material including the above but is not limited thereto and may be formed of various other materials which do not disturb wireless charging.

The cover unit 100 includes an inner cover main body 110 and an outer cover main body 120 configured to surround the outside of the inner cover main body 110.

The inner cover main body 110 is formed to correspond to a shape of the mobile device 1 and thus may surround a back surface portion and a side surface portion of the mobile device 1, and a mounting groove 111 is formed in a lower portion of the back surface portion so that the first power source attaching part 200 which will be described below is mounted therein.

The outer cover main body 120 is coupled to a rear of the inner cover main body 110 to surround the inner cover main body 110 and, to this end, is formed to correspond to a shape of the inner cover main body 110.

Further, the first power source attaching part 200 is installed in the mounting groove 111 between the inner cover main body 110 and the outer cover main body 120. In the case of the present embodiment, a metal plate attachable to a magnet is applied to the first power source attaching part 200, and the first power source attaching part 200 is formed in a plate shape corresponding to the mounting groove 111 to be attached thereto.

In the present embodiment, although the outer cover main body 120 is detachably coupled to the outside of the inner cover main body 110, the inner cover main body 110 and the outer cover main body 120 may also be formed to be inseparable because the first power source attaching part 200 is completely coupled thereto in an embedded state.

The wireless charge activation part 300 activates the wireless charging function so that power supplied from the power source device may be supplied to a battery part of the mobile device 1 when the power source device approaches to a location at which wireless charging may be performed.

As shown in FIG. 1, the mobile device 1 is shown in a shape of a smart phone in the present embodiment but is not limited thereto, and information and communication devices which are portable, mobile and wirelessly chargeable, that is, all of a mobile phone, a tablet PC, a PDA, a smart watch, and the like may be applied thereto.

Further, the mobile device case 10 of the present disclosure may further include a battery unit 400 detachably attached to the cover unit 100 and configured to supply power.

The battery unit 400 includes a charging part 420 configured to supply power to wirelessly charge the mobile device 1, an induction coil part configured to transfer the power from the charging part 420 to the mobile device 1 so that the wireless charging may be performed, and a second power source attaching part 480 coupled to the first power source attaching part 200 to be attached to the cover unit 100.

The battery unit 400 includes a battery main body 410 having a predetermined inner space so that the charging part 420 may be accommodated therein and includes a coil mounting plate 460 coupled to a front portion of the battery main body 410 exposed to the cover unit 100.

The battery main body 410 has a predetermined inner space so that the charging part 420 may be accommodated therein as described above, and a light emitting lamp 430 capable of emitting light through the power charged in the charging part 420 is formed on a back surface portion of the battery main body 410. Generally, the mobile device 1 is provided with a lamp for camera recording, and the lamp may be driven when serving as a flash used in a dark place in addition to image recording using a camera. However, since the mobile device 1 should be operated to drive an application installed in the mobile device 1 or input a separate light emitting command, the lamp provided in the mobile device 1 is difficult to quickly turn on.

In the present embodiment, since the light emitting lamp 430 is provided behind the battery main body 410 and a lighting button 440 configured to turn the light emitting lamp 430 on and off is provided at one side of the battery main body 410, the light emitting lamp 430 may be operated by a user using only the lighting button 440 without turning on the mobile device 1 when necessary.

Further, although not shown, since a charging port to which a charging terminal of a wired charging device configured to charge the charging part 420 may be coupled is provided at a lower portion of the battery main body 410, the charging part 420 may be separately charged using the wired charging device.

The coil mounting plate 460 is coupled to the front portion of the battery main body 410 to cover the charging part 420 to prevent exposure to the outside, and the coil mounting plate 460 is provided with a charging coil 470 for the wireless discharge.

In the case of the present embodiment, a charging method for the wireless discharge of the mobile device 1 is a magnetic induction method, and the charging coil 470 is embedded in coil mounting plate 460 to generate a magnetic field. The charging coil 470 may be installed to be close to the battery.

The coil mounting plate 460 is also provided with the second power source attaching part 480 configured to couple the battery unit 400 to the cover unit 100. The second power source attaching part 480 of the present embodiment is formed from two permanent magnets located under the charging coil 470 at the coil mounting plate 460, and a formation location of the second power source attaching part 480 corresponds to a forming location of the first power source attaching part 200. Accordingly, when the battery unit 400 approaches a rear of the cover unit 100, the second power source attaching part 480 and the first power source attaching part 200 are attached to each other by a magnetic force and maintain a coupled state.

Particularly, when the second power source attaching part 480 and the first power source attaching part 200 are positioned at locations corresponding to each other, coupling by the magnetic force may be maintained, and since locations of coil parts embedded in the charging coil 470 and the mobile device 1 correspond to each other and thus the wireless charging may be performed when the second power source attaching part 480 and the first power source attaching part 200 are positioned at the above locations, the first power source attaching part 200 and the second power source attaching part 480 also serve to guide a location in which the cover unit 100 and the battery unit 400 are coupled to each other.

Further, a substrate 450 is provided on the battery main body 410 to form the light emitting lamp 430, and since driving of the substrate 450 may be influenced by the second power source attaching part 480, the second power source attaching part 480 is formed at a location not overlapping the substrate 450.

In the present embodiment, although the first power source attaching part 200 is formed of a metal plate and the second power source attaching part 480 is formed of a magnet, the first power source attaching part 200 may be formed of a magnet and the second power source attaching part 480 may be formed of a metal plate, and alternatively, both the first power source attaching part 200 and the second power source attaching part 480 may be formed of a magnet.

Figure 6:
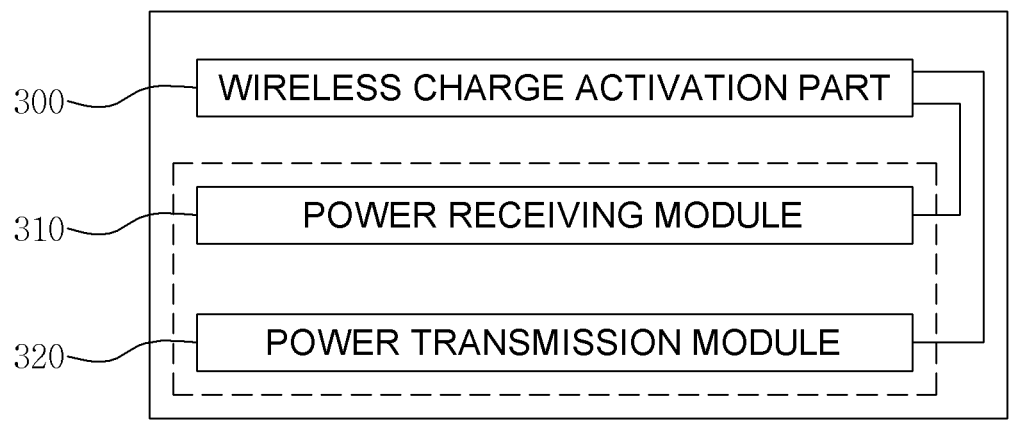
FIG. 6 is a block diagram illustrating a configuration of a wireless charge activation part in the case for a mobile device in FIG. 1.

In FIG. 6, elements including the wireless charge activation part 300 provided to perform the wireless charging function are shown. A power receiving module 310 and a power transmission module 320 additionally mentioned in the drawing are provided to wirelessly receive the power for the mobile device 1 and transmit the power to the mobile device 1 when the battery unit 400 which is a power source device approaches to and is coupled to the cover unit 100.

That is, when the wireless charging function is activated by the wireless charge activation part 300, the power receiving module 310 wirelessly receives the power from the battery unit 400 and transmits the received power to the battery part or a power part of the mobile device 1 by the power transmission module 320.

The power receiving module 310 and the power transmission module 320 and, in some cases, also the wireless charge activation part 300, may be complexly implemented as one chipset integrated in the cover unit 100 (for example, system on chip (SOC)).

In the above-described mobile device case 10 according to the present disclosure, the user usually mounts only the cover unit 100 on the mobile device 1 to use as a general terminal case, and when the wireless charging is necessary, the battery unit 400 is coupled to the mobile device 1 to perform the wireless charging.

In this case, the first power source attaching part 200 and the second power source attaching part 480 are used to couple the battery unit 400 and the cover unit 100, and when the battery unit 400 and the cover unit 100 are coupled to each other so that the locations of the first power source attaching part 200 and the second power source attaching part 480 correspond to each other, the wireless charging function is activated to wirelessly charge the wireless charge activation part 300, and since currents flow through the charging coil 470 and the magnetic field is generated, the charging is performed.

Since the mobile device case 10 of the present embodiment may maintain a coupled state like a case in which the battery unit 400 is integrated with the cover unit 100 even when the wireless charging is performed, the mobile device 1 may be charged even while being continuously used.

According to the present disclosure, since a wireless charge activation part configured to serve as wireless charge activation or wireless charge deactivation is embedded in a mobile device case, power of a battery can wirelessly charge a mobile device, and since connection of a separate cable is not necessary, portability, mobility, and convenience of use can increase.

Those skilled in the art may recognize that effects from the present disclosure are not limited to the above and widely accepted.

The descriptions of the provided embodiments are provided to be used or performed by those skilled in the art. Various modifications of the embodiments are apparent to those skilled in the art, and general principles defined herein may be applied to other embodiments within the present disclosure. Accordingly, the present disclosure is not limited to the embodiments provided herein and should be interpreted in maximum scope corresponding to the principled provided herein and new characteristics.

What is claimed is:

1. A case for a mobile device comprising:
 a cover unit mounted on a mobile device to protect the mobile device;
 a first power source attaching part provided in the cover unit, and attached to and detached from a power source device configured to wirelessly charge the mobile device;
 a wireless charge activation part configured to perform charging of a battery of the mobile device when the power source device is recognized as being close to the mobile device; and
 a battery unit including a charging part detachably attached to the cover unit at a rear of the cover unit, and configured to supply power to wirelessly charge the mobile device, an induction coil part transferring the power from the charging part to the mobile device so that the mobile device is wirelessly chargeable, and a second power source attaching part coupled to the first power source attaching part to be attached to the cover unit wherein:
 the cover unit includes an inner cover main body formed in a shape corresponding to the mobile device to surround a back surface portion of the mobile device and an outer cover main body formed in a shape corresponding to the inner cover main body to surround the inner cover main body; and the first power source attaching part is formed to be located between the inner cover main body and the outer cover main body.

2. The case for a mobile device of claim 1, wherein the cover unit is made of polycarbonate (PC), polyurethane (PU), silicon, or a composite material including the above.

3. The case for a mobile device of claim 1, wherein the first power source attaching part and the second power source attaching part are provided at locations corresponding to each other in the cover unit and the battery unit, and one or both of the first power source attaching part and the second power source attaching part is formed of a magnet for magnetic coupling or a metal material coupled to the magnet.

4. The case for a mobile device of claim 1, wherein the battery unit includes a battery main body having a predetermined inner space so that the charging part is accommodated therein and a coil mounting plate coupled to a front of the battery main body exposed to the cover unit and provided with the induction coil part and the second power source attaching part.

5. The case for a mobile device of claim 4, wherein the battery main body is provided with a light emitting lamp turned on through a charging power source of the charging part and a lighting button configured to turn the light emitting lamp on and off.

6. The case for a mobile device of claim 5, wherein:

a substrate part configured to mount the light emitting lamp is embedded in the battery main body; and the second power source attaching part formed on the coil mounting plate is positioned so as not to overlap the substrate part and the induction coil part so as not to affect driving of the substrate part and the induction coil part.

* * * * *